Aug. 7, 1923.
H. A. HANSON
GEAR SHIFT
Filed Nov. 21, 1921
1,464,038
5 Sheets-Sheet 2
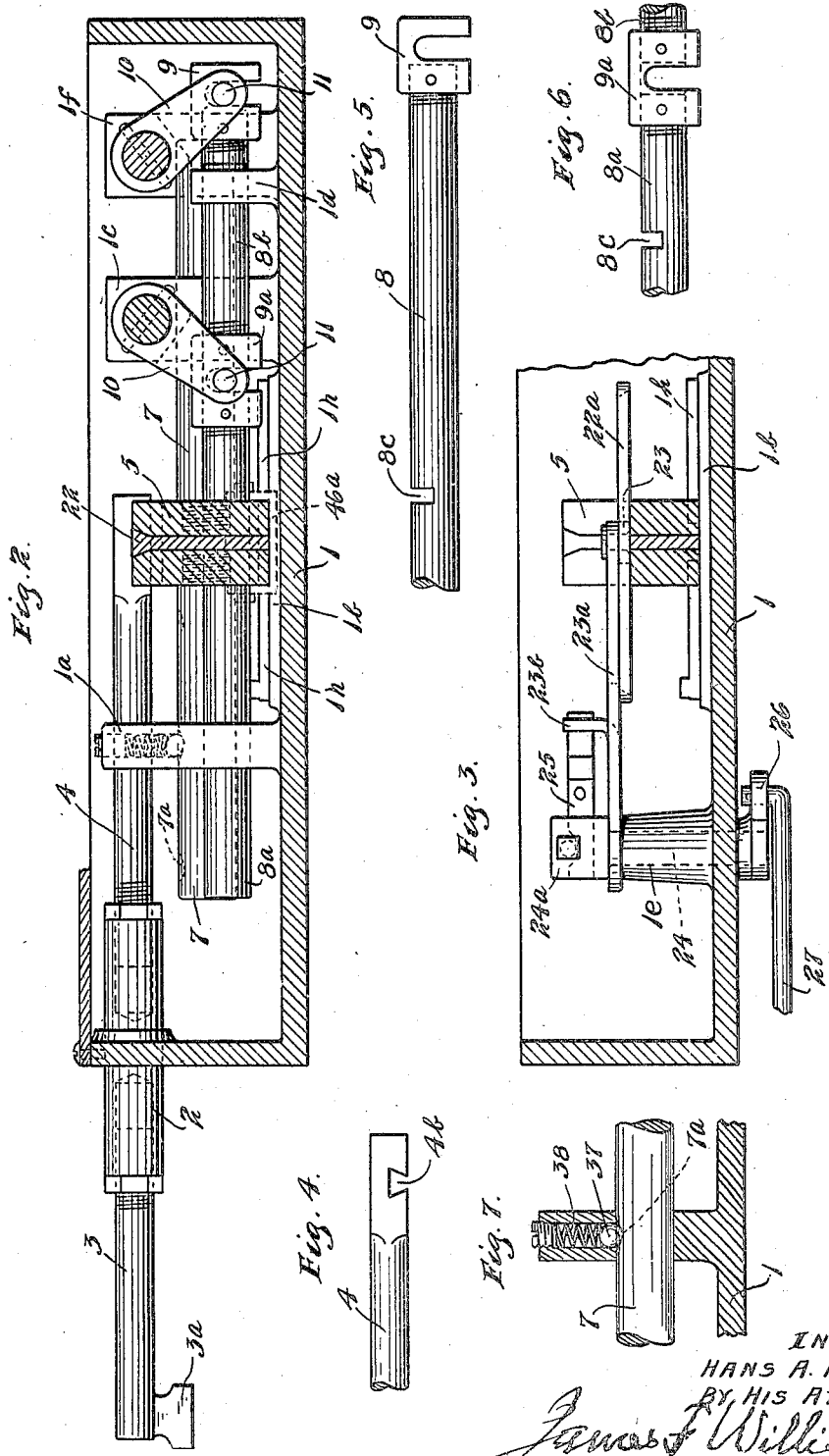
INVENTOR.
HANS A. HANSON.
BY HIS ATTORNEY

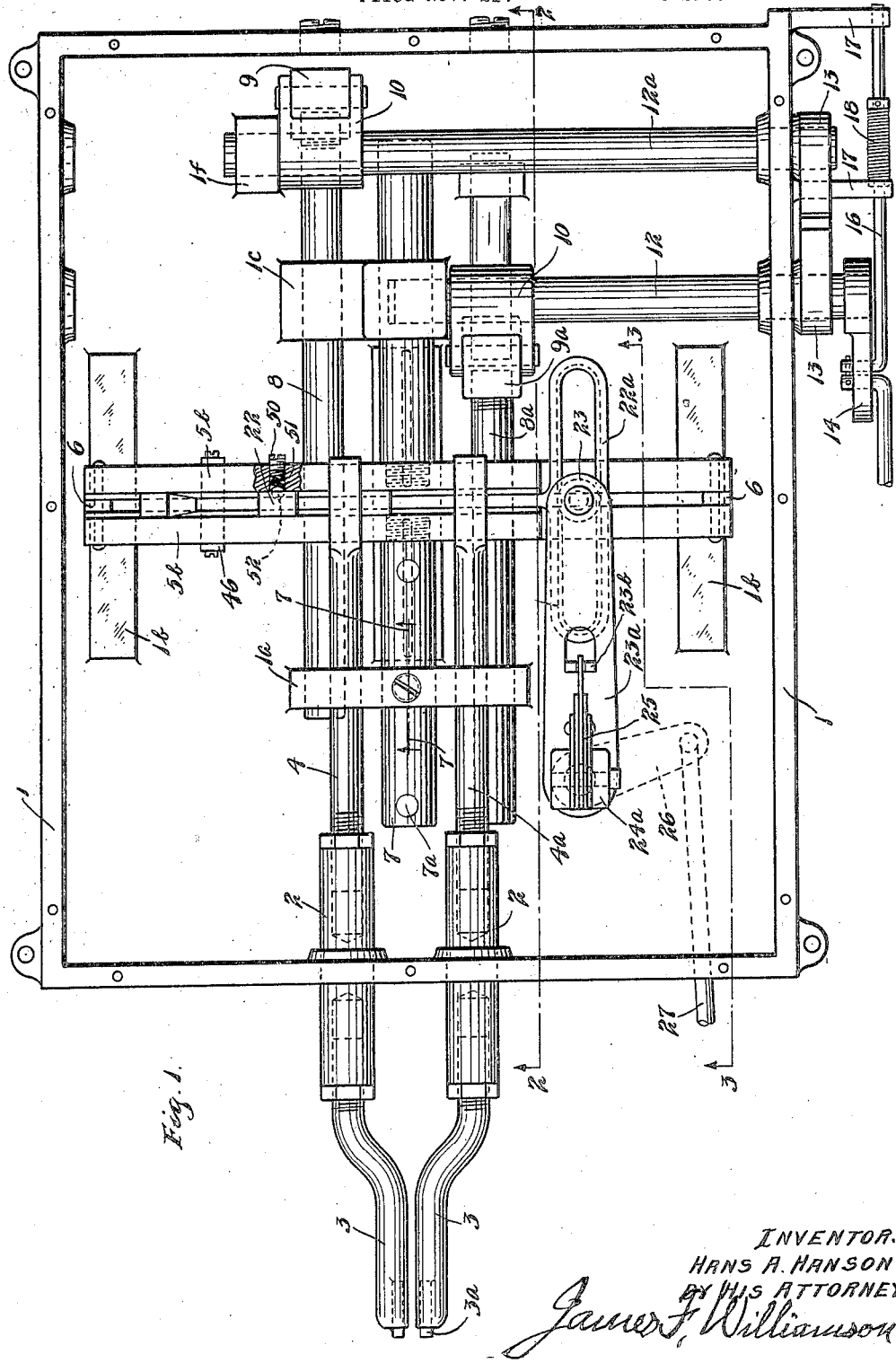

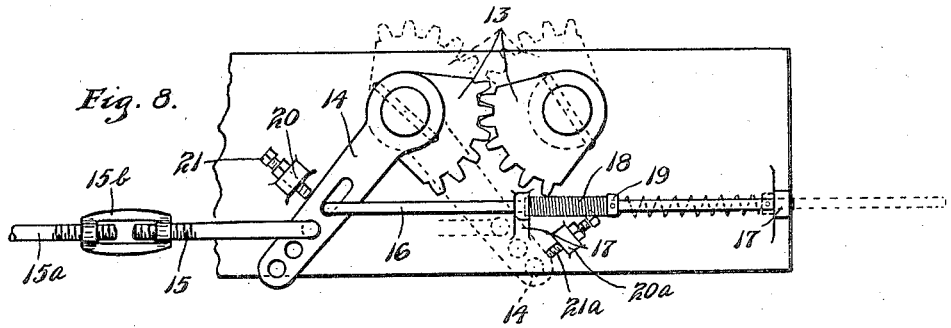
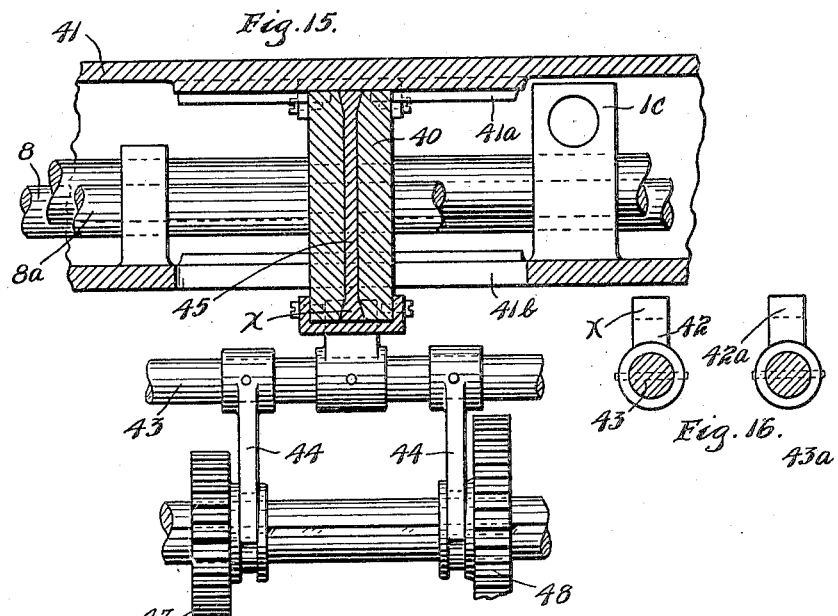
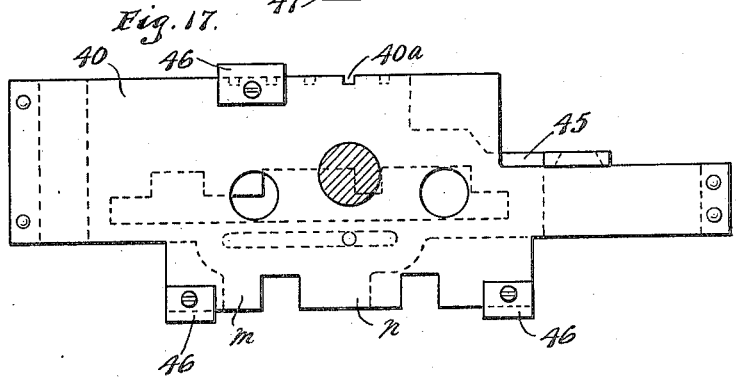

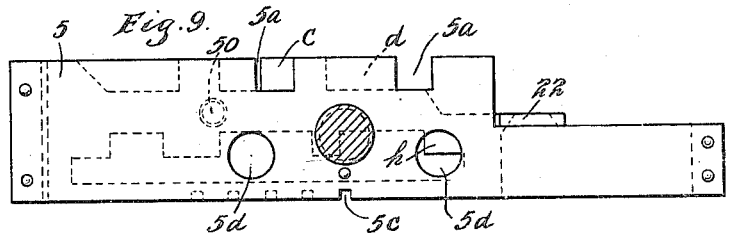
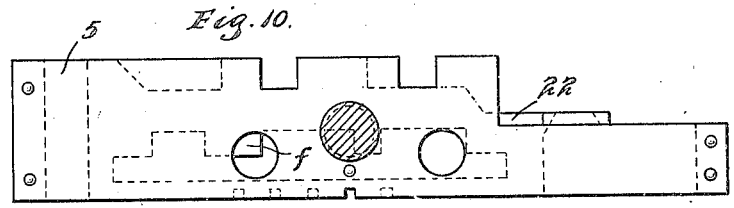
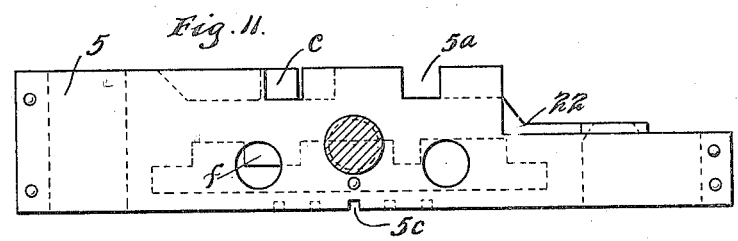
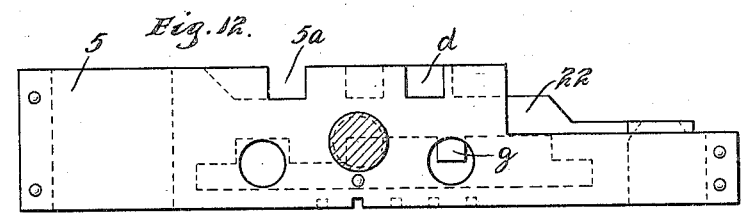
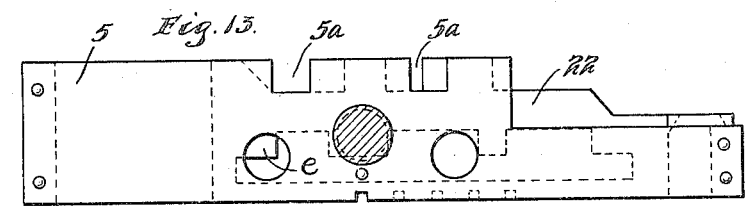
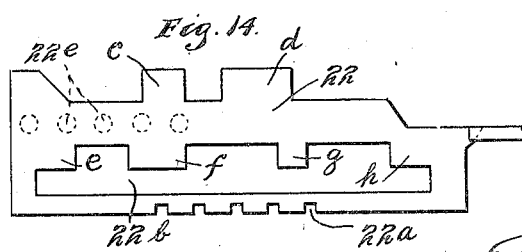

Aug. 7, 1923.
H. A. HANSON
GEAR SHIFT
Filed Nov. 21, 1921
1,464,038
5 Sheets-Sheet 5
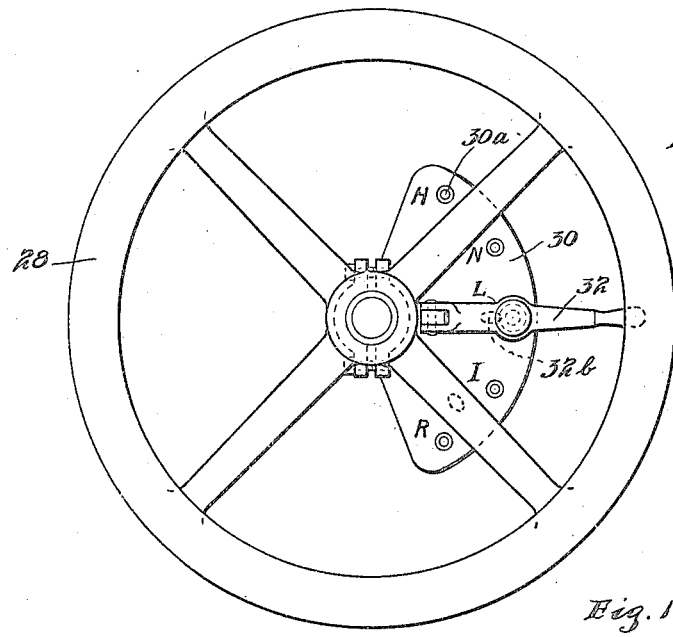
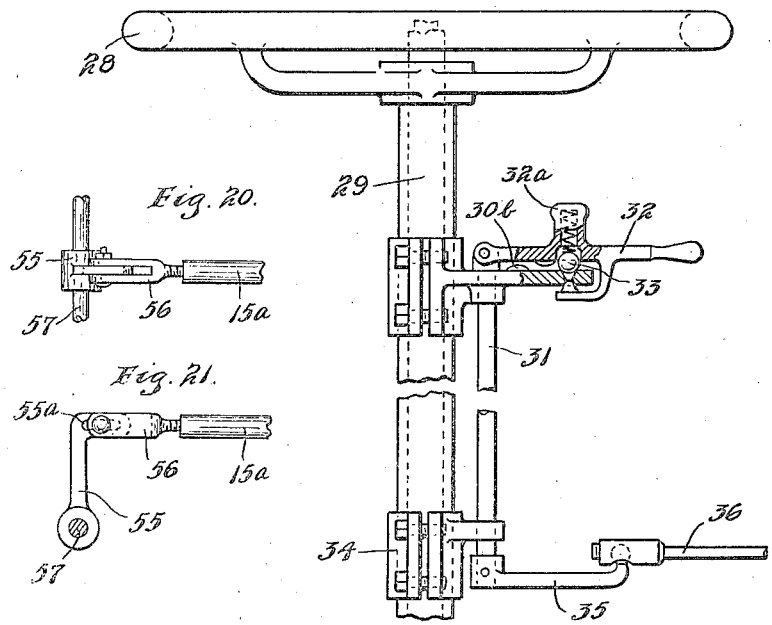
INVENTOR.
HANS A. HANSON.
BY HIS ATTORNEY.
James F. Williamson Patented Aug. 7, 1923.

1,464,038

UNITED STATES PATENT OFFICE.

HANS A. HANSON, OF EAU CLAIRE, WISCONSIN, ASSIGNOR OF FORTY-FIVE ONE-HUNDREDTHS TO FRANK LOTT, OF EAU CLAIRE, WISCONSIN.

GEAR SHIFT.

Application filed November 21, 1921. Serial No. 516,608.

*To all whom it may concern:*

Be it known that I, HANS A. HANSON, a citizen of the United States, residing at Eau Claire, in the county of Eau Claire and State of Wisconsin, have invented certain new and useful Improvements in Gear Shifts; and I do hereby declare the following to be a full, clear, and exact description of the invention, such as will enable others skilled in the art to which it appertains to make and use the same.

This invention relates to an automobile gear shift mechanism, and particularly to such a mechanism adapted to be contained in an oil-tight casing so that the parts of the mechanism will move in oil and be thoroughly lubricated at all times.

It is an object of this invention to provide such a shift mechanism which is easily applicable to the transmission gears of various automobiles and which can be applied so as to be disposed either in the rear of the transmission mechanism and the casing therefor, or on top of such a transmission mechanism and casing.

It is a further object of the invention to provide such a gear shift mechanism having two members which are adapted to be connected to the transmission gearing, which members are reciprocable to two longitudinal positions to properly move and adjust the gearing.

It is still a further object of the invention to provide a reciprocating member in the gear shift casing, which member is engaged by means adapted to be moved by connections to the clutch pedal of the automobile, and which member is also engaged by a pair of members adapted to be connected to the transmission gearing. The reciprocating member is variously locked to the said means and the said pair of members by a valve member which is movable relatively thereto and transversely to the line of movement of said reciprocating member, which valve member is arranged to be moved by mechanism disposed on the steering wheel of the automobile, or in some position adapted for convenient manipulation by the driver of the automobile.

Another object of the invention is to provide guiding means in the said oil proof casing for the reciprocating member above mentioned and for the pair of members extending to the transmission gearing, and also for the members adapted to be locked to the reciprocating member which are connected to the operating means which is operated by the movement of the clutch pedal, so that these various members will be given a right line motion.

These and other objects and advantages of the invention will be fully set forth in the following description made in connection with the accompanying drawings in which like reference characters refer to the same parts throughout the different views, and in which, Fig. 1 is a plan view of the shift mechanism with the top of the casing removed;

Fig. 2 is a vertical section taken on the line 2—2 of Fig. 1, as indicated by the arrows;

Fig. 3 is a vertical section taken on the line 3—3 of Fig. 1, as indicated by the arrows;

Figs. 4, 5 and 6 are fragmentary views in elevation of certain details shown in Fig. 2;

Fig. 7 is a section taken on the line 7—7 of Fig. 1;

Fig. 8 is a partial view in side elevation of the exterior of the shift casing;

Figs. 9 to 13 are views in elevation of a reciprocating member of the shift mechanism showing the different positions of the locking valve used;

Fig. 14 is a view in side elevation of the valve;

Fig. 15 is a partial section similar to Fig. 2 but showing a modification;

Fig. 16 is a fragmentary sectional view of a part of the structure shown in Fig. 15;

Fig. 17 is a transverse vertical section showing a modified form of valve and reciprocating member;

Fig. 18 is a plan view of the controlling mechanism applied to the steering wheel; and Fig. 19 is a view in vertical elevation of the same, a part thereof being shown in section; and Figs. 20 and 21 are a plan view and side view, respectively, of a connection to the clutch shaft.

Referring to the drawings, the casing 1 of general rectangular outline is shown which is adapted to contain the various moving parts of the shift mechanism and which is also to be constructed to contain oil so that the various parts will move in oil and thus be at all times thoroughly lubricated. This casing 1 is made of suitable metal, preferably of aluminum. Spaced bosses are provided at the front end of the casing and bushings 2 are fitted for sliding movement therethrough. Members 3 are threaded into the front end of these bushings which project from the casing 1 and are held in suitably adjusted positions by lock nuts thereon. The members 3 are provided with heads $3^a$ adapted to connect with the shifting parts in the transmission casing to move the transmission gears to their various positions. This movement of the gears will be accomplished by the members 3 moving to two different longitudinal positions. Rods 4 and $4^a$ are threaded into the rear ends of the bushings 2 and held in suitable adjusted position therein by check nuts disposed thereon and seated against the ends of the bushings. The rods 4 are of circular cross section for the greater part of their length and pass through and are guided in openings in an upstanding lug or post $1^a$ integral with the bottom of the casing 1. At their rear ends, the rods 4 are formed of rectangular cross section and adapted to fit in rectangular slots $5^a$ formed in the top of a reciprocating member 5. The rods 4 and $4^a$ are provided with downwardly open slots $4^b$ adjacent their ends which are adapted to receive parts of a key member to be later described.

The member 5 is formed of two parts $5^b$ suitably spaced by members 6 at the ends thereof and riveted, or otherwise, secured together in such spaced relation. The member 5 rests and slides upon raised steps or pads $1^b$ integral with the bottom of the casing 1 and raised slightly above the bottom thereof. The top of these pads $1^b$ will be finished to form a smooth sliding surface for the member 5. The member 5 is guided for right line movement transversely of its length by guiding members 7 formed with reduced threaded portions at their ends, which portions are screwed into the members $5^b$ at the front and rear sides thereof. The member 7, at the front, is fitted to slide through an opening in the post $1^a$, and the member 7 at the rear is, likewise, fitted to slide through an opening in the post $1^c$ which also is integral with and upstands from the bottom of the casing 1. The member 5 is provided in its lower surface with a slot $5^c$, which slot fits over and alines with guiding ridges $1^h$ rising from the bottom of the casing 1, and having an upstanding shoulder near one end.

The member 5 is adapted to be reciprocated transversely of its length in the guides described by a pair of rods 8 and $8^a$ which are alternately locked to the member 5 by means to be later described. The rod 8 extends rearwardly of the casing and is fitted and guided in an opening in the post $1^c$ and at its rear end is threaded into a head 9 provided with a vertically extending slot. The rod $8^a$ extends rearwardly of the member 5 and is threaded into a head $9^a$ also provided with a vertical slot open at the bottom thereof. Another rod $8^b$ is threaded into the rear end of the head $9^a$ and extends rearwardly of the casing where it fits and slides in an opening in the post $1^d$ integral with and rising from the bottom of the casing 1. The heads 9 and $9^a$ are reciprocated by crank arm members 10 which are provided with transverse pins 11 which are disposed in the slots in said heads in contact therewith to move the same. The arms 10 are pinned, or otherwise, rigidly secured to a pair of rods or shafts 12 and $12^a$ which extend transversely of the casing 1 and through bosses in the side thereof. At its inner end, the rod 12 is journaled in an opening formed in the post $1^c$ and the shaft $12^a$ is at its inner end journaled in a post $1^f$ integral with and upstanding from the bottom of the casing 1. These shafts have secured thereto outside of the casing, meshing gear segments 13 and the shaft 12 is further rigidly secured to an arm 14 extending downwardly at the side of the casing 1 and having a series of holes therein for connection to a rod 15 which is connected by turn buckle $15^b$ to a rod $15^a$ which is, in turn, connected to the clutch pedal of the automobile. Rod $15^a$ receives an adjustable fork 56, embracing an arm 55 secured to clutch shaft 57. Arm 55 has a slot $55^a$ therein through which passes a bolt secured in fork 56. With this connection, the clutch will be released before rod $15^a$ is moved. The arm 14 also has a slot intermediate of its length and a rod 16 is slidably connected therein and adapted to reciprocate in openings in lugs 17 projecting from the side of the casing. The rod 16 is encircled by a suitable spring 18 disposed thereon between said lugs, one end of which contacts with a collar 19 secured to said rod. It will be evident that the spring will be compressed when the arm 14 is swung, as shown in Fig. 8, and will expand to move the arm to the dotted position shown. Lugs 20 and $20^a$ are provided on the side of the casing 1 and threaded to receive stop screws 21 and $21^a$ held in suitable position by the usual check nuts, which screws form stops for the forward and rearward movement of the arm 14. As stated, the rods 8 and $8^a$ pass through openings $5^d$ in the member 5 and are adapted to be locked thereto at various times and for this purpose these rods are provided with upwardly opening vertical slots $8^c$ shown in Figs. 5 and 6.

To variously connect the rods 4 and $4^a$ and the rods 8 and $8^a$ to the member 5, a key member 22 is provided. This member is shown in cross section in Fig. 2 and is somewhat V-shaped at its upper end to fit between the beveled portions of the members 5 5ᵇ. The member 22 is adapted to slide between the members 5ᵇ and is formed as a flat plate having at one end a transversely extending flat horizontal slotted head 22ᵃ. A roller 23 is disposed in the slot in the head 22ᵃ and is journaled in one end of an arm 23ᵃ, the other end of which arm rests upon the top of a post 1ᶜ upstanding from and integral with the bottom of the casing 1. The arm is apertured and pivoted upon a stud 24 extending vertically through the post 1ᶜ and having at its upper end a bifurcated head 24ᵃ which rests upon the top of the arm 23. Clamped between the bifurcations of the head 24ᵃ by a suitable clamping bolt, are a plurality of spring leaves 25 suitably riveted together at some distance from the head 24ᵃ. The central one of these leaves extends forwardly and is seated in a vertical slot formed in a lug 23ᵇ upturned from the arm 23. The lower end of the post 24 has rigidly secured thereto an arm 26, to the other end of which is pivoted a rod 27. This rod is adapted to be actuated by the driver of the automobile by a mechanism to be later described. It will be evident that when the rod 27 is moved longitudinally, the arm 23 will be yieldingly oscillated by the spring 25 and the key member 22 will be reciprocated longitudinally of the member 5.

Referring to Figs. 18 and 19, the steering wheel 28 and a steering column 29 of ordinary construction are shown and the member 30 is, by means of a split hub, clamped to the post 29. The member 30 comprises a segmental plate having bi-conical openings 30ᵃ equally and circumferentially spaced near its edge. The member 30 is provided with a downwardly extending lug adjacent its center in which is journaled a rod 31, to the flattened upper end of which is pivoted by a horizontal pivot, the bifurcated end of a hand lever 32. This lever extends outwardly across the top of the plate 30 and has a projecting portion extending downwardly at the front edge thereof and under the said plate, which portion is provided with an upstanding lug adapted to be received some distance into the openings 30ᵃ. Immediately above said lug the lever 32 is provided with an upstanding post 32ᵃ which is bored to receive a coiled compression spring, which bore is somewhat enlarged to partially receive a ball 33. This ball is pressed down against the plate 30 and tends to swing the lever upwardly so that the lug beneath the plate will engage in the openings 30ᵃ. The lever is thus held in the various positions in line with said openings and can be moved from one to the other by depressing its outer end and swinging the same laterally. The various holes designate the various positions to which the gears are to be moved by the shift mechanism and are designated by the letters R, N, L, I and H, which indicate, respectively, the reverse, neutral, low, intermediate and high speed positions. The plate 30 is provided with an upstanding lug 30ᵇ and the lever 32 with a downwardly projecting lug 32ᵇ which are adapted to engage slightly as the lever moves into reverse position. The increased resistance caused by moving these lugs past each other will serve as notice to the driver of the automobile that he is moving the lever 2 to reverse position. The rod 31 extends downwardly along the side of the steering wheel post 29 and is guided in a lug formed in a member 34 which is provided with a split sleeve clamped to said post. The lower end of the rod 31 has secured thereto an arm 35 which is, in turn, by means of a universal joint, connected to a rod 36. The rod 36 will be directly or indirectly connected to the rod 27 already described, so that when lever 32 is moved and the rod 31 turned, the rod 27 will also be moved and will move the key member 22.

The key member 22 is provided on its bottom surface with five notches 22ᵃ which, in its various positions, will aline with the ribs 1ʰ, which ribs will act as guides for the key and prevent longitudinal movement thereof. The key is also provided with a slot 22ᵇ extending longitudinally thereof which accommodates the rods 8 and 8ᵃ. Tongues c and d project from the top of the key and tongues e, f, g and h extend downwardly from the key into the slot 22ᵇ. The tongues c and d are adapted to be received in the slots 4ᵇ in the rods 4 and 4ᵃ.

The operation of the device and the manner in which the valve connects the various parts will now be described.

When it is desired to shift the gears the clutch pedal of the automobile will be moved to release the clutch. This will swing the arm 14, as shown in Fig. 8, and the gear segments 13, together with the shafts 12 and 12ᵃ will be swung in opposite directions and the rods 8 and 8ᵃ will, likewise, be moved in opposite directions. One of these rods will be connected to the member 5 and the member 5 will be moved to its central position, as shown in Figs. 1 and 2. The lever 32 will now be moved to the position on plate 30 which indicates the position in which it is desired to shift the gears. The device is shown in Figs. 1 and 2 with the lever 32 in the "high" position, and at this time, the key will occupy the position shown in Fig. 9. The tongue c is then in engagement with the slot 4ᵇ in the rod 4 and this rod and member 3 are thus locked to member 5 and will be moved therewith. Also, at this time, the tongue $h$ has moved into alinement with the opening $5^d$ and in engagement with the rod $8^b$ in member $8^a$ and this latter member is thus locked to the member 5. When the clutch pedal was operated, therefore, and the arm 14 moved, the member 5 was shifted to its middle position by the member $8^a$ and the member 3 was moved rearwardly to its middle position by the rod 4. If the lever 32 now be moved to neutral position, the key will move to the position shown in Fig. 10, at which time, neither of the tongues $c$ and $d$ will engage with the slots $4^b$ and members 4 and $4^a$ but the tongue $f$ will move into the slot $8^b$ of member 8. When the clutch pedal is released and the clutch engaged the rod 15 will be moved rearwardly, and this, together with the action of spring 18, will swing the arm 14 and segments 13 to the dotted line position shown in Fig. 8. Member 5 will now be reciprocated by rod 8 and will be moved toward post $1^a$ and into substantial engagement therewith. As neither of the rods 4 or $4^a$ are connected to member 5, neither will be moved and they will continue to occupy the position shown in Fig. 1, which is their neutral position. The gears will thus remain in neutral. If it now be desired to move the gears into low, the clutch will be again operated and the member 5 will be similarly moved by the rod 8 to its central position. The lever 32 will then be swung to the low position and key 22 will move to the position shown in Fig. 11. The tongue $c$ will then move into the slot $4^b$ of rod 4 and tongue $f$ will still remain in engagement with slot $8^b$ and rod 8. The members 4 and 8 will thus be locked to member 5 and when the clutch pedal again moves to engage the clutch, the member 4 and its connected member 3 will be moved forwardly by the member 5 as the latter member is moved forwardly by rod 8. To move the gear into the intermediate and high positions, the same operations will be performed and the key 22 will move into the positions shown in Figs. 12 and 13. In the positions shown in Fig. 12, tongue $d$ will connect rod $4^c$ and tongue $g$ will connect rod $8^a$. In the position shown in Fig. 13, the tongue $d$ will still connect rod $4^a$ and tongue $e$ will connect or lock rod 8 to the member 5. It is thus seen that with each position of the key one of the rods 8 or $8^a$ is locked to member 5 and with each position of the key, except the neutral position, one of the rods 4 or $4^a$ is locked or connected to the member 5. The rods 4 and $4^a$, and hence, the members 3 are given the desired longitudinal movements and the gears accordingly shifted. In order to provide some stop or indicating means for the member 5, the post $1^a$ is bored immediately over the forward rod 7 and a ball member 37 is spring pressed downwardly in said bore by a spring 38 held in place by a suitable cap screwed in the top of said bore. The ball 37 will engage with suitable depressions $7^a$ formed in the top of rod 7 and so disposed that they will aline with the ball in said post when said rod is in its forward, central and rearward positions.

When the gear shift mechanism is mounted over the gear transmission casing, the arrangement will be such as shown in Figs. 15 and 16. The member 40 corresponding to member 5, above described, will have its slot $40^a$ similar to slot $5^c$ formed in its top surface, which slot will engage with ribs $41^a$ depending from the top of the casing 41. The casing 41 may be either separate from the gear transmission casing and similar to the casing 1 and provided with an opening $41^b$ in its bottom to communicate with the gear transmission casing or it may be made integral with the gear transmission casing if desired. In addition to sliding on the bottom of the casing, the member 40 projects through the opening $41^b$ and members 42 and $42^a$ will be provided and be rigidly connected to rods 43 and $43^a$ which will, in turn, be connected by suitable clutch forks 44, to the movable gears 47 and 48, which are moved to make the various gear combinations. The member 40 will be tapered at its inner edges at top and bottom and the valve 45 slidable therein will be similarly shaped, as shown in Fig. 15. Members 42 and $42^a$ will be provided with slots $x$ through which the valve members 45 will move. The valve members 45 will be so formed, as shown in Fig. 17, that instead of having the tongues $c$ and $d$ project from the top, it will have tongues $m$ and $n$ projecting from the bottom. Otherwise, the parts and operation will be as already described, and the key 45 will be shifted in the same manner as the valve 22 already described. The valve 45 will be connected with 8 and $8^a$ and to the members 42 and $42^a$ in the same manner as already described for the members 8 and $8^a$ and for the members 4 and $4^a$.

The member 5 and also the member 40 may be equipped with clamps 46 at its top or bottom to securely hold the two parts thereof in proper spaced relation.

The casing 1 is provided with apertured lugs at its sides for attachment to the desired part of the automobile. Said casing will be provided with a cover which will be held in place by small screws tapped into the top edge of the casing sides. The casing is also provided with bosses at each side thereof in alinement with the shafts 12 and $12^a$, which bosses may be bored in a manner suitable to receive said rods 12 and $12^a$. These openings are provided in case it is found more desirable to dispose arm 14 and segments 13 and their associated parts on the other side of the casing than that shown. The casing is also provided with openings in its rear side for alinement with the rods 8 and 8ª, which openings are also closed by suitable threaded plugs. These openings are provided for convenient removal of said rods in case of repair or dismantling.

It may also be noted that one of the members 5ᵇ is provided with a cylindrical opening at the outer end of which is screwed a cap screw 50. A ball 52 is disposed in the opening and pressed toward the key member 22 by a coiled spring 51. The valve member 22 is provided with five semispherical depressions 22ᵇ with which the ball 52 is adapted to engage when the key is moved to its various positions. The ball 52, therefore, forms a stop mechanism for determining the correct positions of the key member 22.

When the device is moved to the "high" position, member 22 will contact with the upstanding shoulder on rib 1ʰ. This shoulder will, of course, be located to suit the particular make of car. The lever 32, it will be noted, can also be shifted to the desired position without releasing the clutch. The yielding connection 25 will then be moved. The gears, however, will not shift until the clutch pedal is moved.

From the above description it is seen that applicant has provided an extremely simple gear shift mechanism comprising very few parts and the structure of which is quite rugged and able to withstand all of the shocks incident to the operation thereof without damage. The parts being disposed in oil, will operate smoothly and with a minimum of friction. It will, of course, be understood, that various changes may be made in the form, details and arrangement of the parts without departing from the scope of applicant's invention, which, generally stated, consists in the matter shown and described and set forth in the appended claims.

What is claimed is:

1. A gear shift device for an automobile having in combination, a pair of members, each adapted to be reciprocated to two positions, a reciprocating member for variously moving said members, a plurality of members actuated by the clutch pedal of the automobile and adapted to be connected to said reciprocating member, and means located for convenient manipulation by the driver of the automobile adapted to be moved to various positions to connect said last mentioned members to said reciprocating member and said reciprocating member to either of said pair of first mentioned members.

2. A gear shift device for an automobile having in combination, a pair of members, each adapted to be longitudinally moved to two positions to effect the gear connections, a sliding member for variously moving said members, means moved by the clutch pedal of the automobile adapted to be connected to said sliding member, and means arranged for convenient control by the driver of the automobile to connect each of said pair of members to the sliding member and to connect said sliding member to the said means moved by the clutch pedal.

3. A gear shift device for an automobile having in combination, a pair of members, each adapted to be reciprocated to two positions, a reciprocating laterally movable member for alternately moving the members of said pair, means movable by the clutch pedal of the automobile adapted to be connected to said reciprocating member, and means movable longitudinally of said reciprocating member and transversely of the movement thereof and controlled from a position convenient to the driver of the automobile for connecting said reciprocating member to the first mentioned means and to one of said pair of members.

4. A gear shift device for an automobile having in combination, a pair of members adapted to be moved to two positions to effect the gear changes, a reciprocating member adapted to be alternately locked to said members to move the same, means for guiding the reciprocating member for rectilinear movement, a plurality of members actuated by the clutch pedal of the automobile adapted to be connected to said reciprocating member, a member guided by said reciprocating member and movable normal to the movement thereof for connecting the same to one of said last mentioned members and to one of said first mentioned pair of members, and means located for convenient manipulation by the driver of the automobile for moving said last mentioned member.

5. The combination with the transmission gear casing of an automobile, of a casing disposed above said casing and having an opening therein communicating therewith, a gear shift mechanism in said latter casing comprising a pair of members each adapted to be reciprocated to two positions, a reciprocating member for variously moving said members, a plurality of members actuated by the clutch pedal of the automobile and adapted to be connected in said reciprocating member, and means located for convenient manipulation by the driver of the automobile adapted to be moved to various positions to connect said last mentioned members to said reciprocating member and said reciprocating member to either of said pair of first mentioned members, said reciprocating member projecting through the last mentioned casing into the transmission casing.

6. A gear shift device for an automobile having in combination, a pair of members adapted to be moved longitudinally to two positions to effect the gear changes, a casing, a reciprocating member in said casing slidably engaged with said members and adapted to be alternately locked thereto, means connected to the clutch pedal of the automobile and comprising rods slidably engaged with said reciprocating member, and a key member slidably engaged with said reciprocating member and movable normal to the movement thereof for variously locking said reciprocating member to one of said first mentioned pair of members and to one of said rods.

7. The structure set forth in claim 6, said key member being moved by an arm connected thereto and yieldingly connected to a rotating member in said casing operated by means located for convenient manipulation by the driver of the automobile.

8. A gear shift device for an automobile having in combination, a pair of members mounted for rectilinear longitudinal movement to two different positions to effect the gear changes, a casing, a reciprocating member therein guided for rectilinear movement and adapted to be variously locked to one of said pair of members for moving the same, a pair of members mounted for right line movement in engagement with said reciprocating member and adapted to be variously locked thereto for moving the same, and a control member guided for rectilinear movement normal to the movement of said reciprocating member and having means thereon for variously locking said reciprocating member to one of said pair of members to said first mentioned pair of members and to one of said last mentioned pair of members.

9. The structure set forth in claim 2, said sliding member comprising two spaced plate members, and means for guiding the same for rectilinear movement.

10. The structure set forth in claim 3, said reciprocating laterally movable member comprising spaced plates and said last mentioned means comprising a plate slidable between said spaced plates.

11. The structure set forth in claim 3, said reciprocating laterally movable member having spaced slots in its top portion through which the ends of said pair of members slide, said pair of members having slots therein, and said last mentioned means comprising a plate having tongues thereon adapted to engage in said slots.

12. The structure set forth in claim 8, said reciprocating member being provided with a pair of slots in its upper surface, and a pair of apertures through its body portion, the first mentioned pair of members being arranged for sliding movement in said slots and having open ended slots formed therein, said second mentioned pair of members being arranged to slide through said openings and also being provided with slots therein, said control member being provided with tongues adapted to enter the slots in the first mentioned pair of members and also being provided with tongues adapted to enter the slots in the second mentioned pair of members to lock the members of both pairs to the reciprocating member.

13. The structure set forth in claim 5, said last mentioned means including a notched key member sliding in said reciprocating member and extending therewith into the transmission casing.

14. The combination with the change gear casing of an automobile having a pair of members therein adapted to be reciprocated to two positions, a casing mounted on the top of said casing and communicating therewith, a reciprocating member for variously moving said members sliding in said second mentioned casing and projecting into the first mentioned casing, a plurality of members actuated by the clutch pedal of the automobile and adapted to be connected to said reciprocating member also disposed in the last mentioned casing, and means located for convenient manipulation by the driver of the automobile adapted to move means to connect said last mentioned members to said reciprocating member and said reciprocating member to either of said pair of first mentioned members.

In testimony whereof I affix my signature.

HANS A. HANSON.